No. 868,074.
PATENTED OCT. 15, 1907.
E. E. CLARK.
SHAFT LINER AND LEVELER.
APPLICATION FILED APR. 13, 1906.
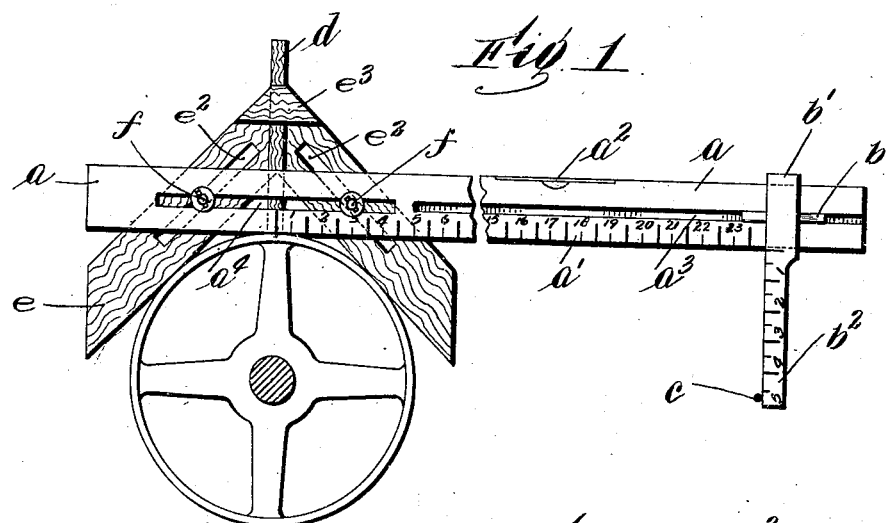
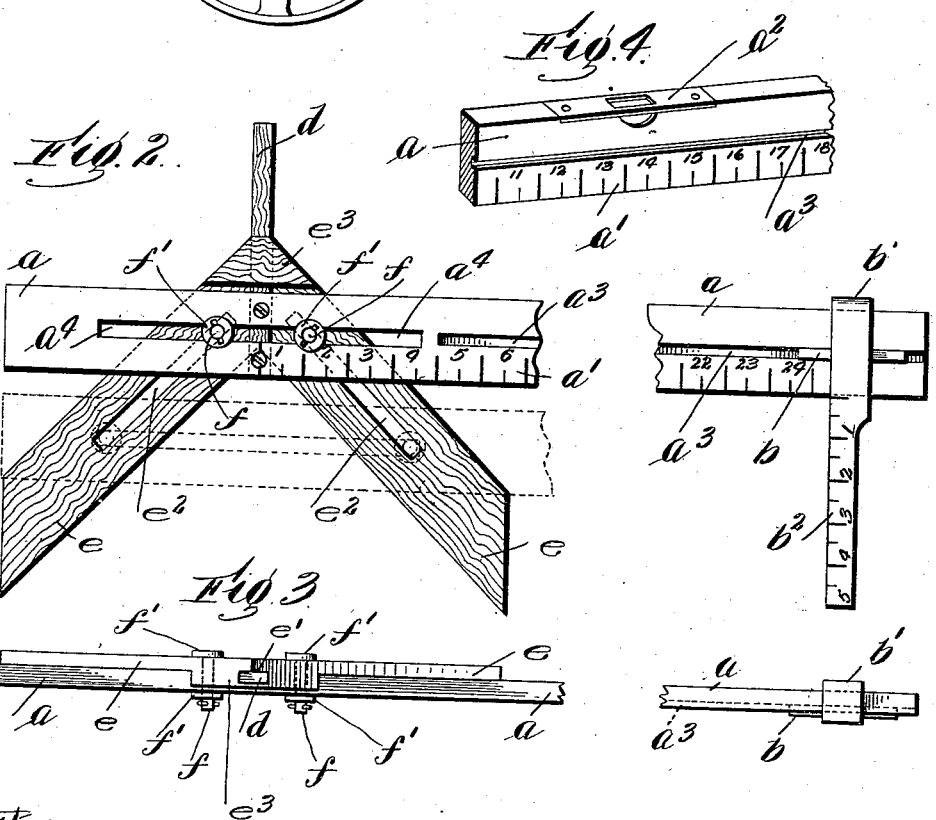
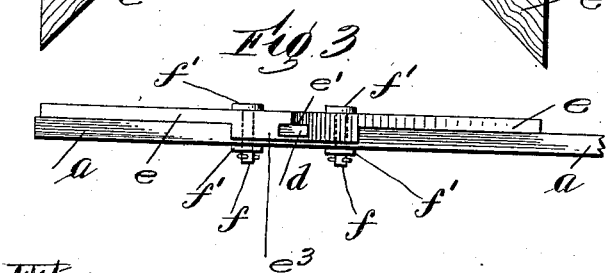
Witnesses:
C. F. Wesson
E. M. Allen
Inventor:
E. E. Clark,
By Attorneys
Southgate & Southgate

UNITED STATES PATENT OFFICE.

ERNEST E. CLARK, OF KILLINGLY, CONNECTICUT.

SHAFT LINER AND LEVELER.

No. 868,074.      Specification of Letters Patent.      Patented Oct. 15, 1907.

Application filed April 13, 1906. Serial No. 311,436.

*To all whom it may concern:*

Be it known that I, ERNEST E. CLARK, a citizen of the United States, residing at Killingly, in the county of Windham and State of Connecticut, have invented a new and useful Shaft Liner and Leveler, of which the following is a specification.

My invention relates to a device for alining and leveling shafting and performing analogous operations.

Many shaft levelers have been devised and some of them have been provided with means for alining shafting as well as leveling it, but usually the alining means is of such a nature that the alining and leveling operations must be separate, the position of certain parts of the instrument being different when the shaft is being leveled from what it is when the shaft is being alined.

The principal objects of my invention are to provide an instrument with means for simultaneously alining and leveling shafting, such means being adjustable in such a manner that it can be applied to shafts and pulleys of varying diameters within wide limits and without necessitating any changing of the positions of the parts in performing the two operations other than the adjustment to provide for the particular diameter of the shaft or pulley to be leveled.

Reference is to be had to the accompanying drawing, which constitutes a part of this specification and in which, Figure 1 is a side elevation of an implement constructed in accordance with the principles of my invention, showing how it is used. Fig. 2 is an enlarged view of the implement itself showing two positions of the parts. Fig. 3 is a plan view of the same, and Fig. 4 is a perspective view of a portion of the main blade of the implement.

I have shown the implement as comprising a main blade $a$ having a straight-edge on the lower side, a scale $a'$ along said straight-edge, and a level $a^2$ set with reference to said straight-edge. Along the blade extends a slot or guide $a^3$ adapted to engage a slide $b$ and to guide the same longitudinally with respect to the blade. On this slide is mounted a body $b'$ adapted to engage the blade and slide along the same, this body being provided with a scale $b^2$ which projects from the straight-edge of the main blade at right-angles thereto. The blade is intended to be used in horizontal position and the scale $b^2$ in vertical position in the ordinary use of the apparatus. It will, of course, be understood that when the straight-edge is placed on top of a pulley or shaft and the blade set in level position, the distance of the top of the pulley or shaft above the base line $c$ can be read directly on scale $b^2$. The amount by which the center of the pulley or shaft is out of alinement with the base line $c$ can be determined and any fault corrected when its diameter is known.

In order to provide for ascertaining the distance of the center of the shaft or pulley from the base line as well as its altitude, I have provided a centering device. Mounted in stationary position on the blade and centrally with respect to the zero line of the scale $a'$, I have shown a guide $d$. This guide is adapted to control the motion of a centering frame $e$, the frame being provided with a perforation $e'$ for receiving the guide. As the guide is perpendicular to the straight-edge of the blade, it will be seen that the frame $e$ will ordinarily be constrained to move in a direction at right-angles to the blade. In order to assist in guiding the frame and to support it at a point below that at which the guide passes through it, I have provided the frame with two slots $e^2$ and the blade with a longitudinal slot $a^4$. The slots $e^2$ make equal angles with the guide and these angles are preferably 45 degrees. Therefore, the two slots are at right-angles to each other.

For the purpose of assisting in the guiding action, a pair of rollers $f$ are provided, each of which passes through the slot $a^4$ and one of the slots $e^2$. It will be seen that in the vertical motion of the frame, the rollers will be forced along the slots and assist in holding the parts in position. As the rollers are provided with heads or flanges $f'$, they prevent a lateral motion of the frame on the blade at the lower part of the frame and thus keep the parts of the device in proper position with respect to each other.

In all positions of the blade and frame a portion of the scaled edge of the blade is obviously located between the two bars or centering edges of the frame and the zero point is always midway between them.

It will be noted that the passage $e'$ is contained in a projection $e^3$ which has a flat lower surface acting as a stop for the frame and preventing its motion below a certain point with respect to the blade.

The frame itself may be of any desired shape but its interior edges are preferably at equal angles, as for example 45 degrees, from the line of the guide for the frame and the path of motion thereof. Consequently, when the straight-edge is placed on the top of a circular object, its surface will engage the inner edges of the frame and force it up a certain distance as is indicated in Fig. 1. On account of the construction and form of the frame, it will be observed that the pulley or other circular object upon which the straight-edge is mounted will be centered vertically on the zero point of the scale $a'$; and consequently, by the adjustment of a body $b'$ along that scale, the distance of the center of the pulley or shaft from the base line can be readily ascertained and any fault easily corrected.

It is to be observed that no part of the device has to be dismounted or set up in any new way between operations when both leveling and alining are to be done, as both operations are performed while the parts are in the same position.

While I have illustrated and described a particular form in which my invention may be embodied, I am aware that it is not limited thereto, as many modifications may be made by a person skilled in the art, without departing from the scope of my invention as expressed in the claims.

Having thus fully described my invention, what I claim and desire to secure by Letters-Patent is:—

1. A shaft liner and leveler, comprising a horizontal blade provided with a scale, a centering frame adjustable vertically on the blade, the zero point of the scale being located in a vertical plane bisecting said centering frame, and a second blade adjustable along said horizontal blade.

2. A shaft liner and leveler comprising a blade having a scale and a level, means mounted on said blade for locating the center of a circular object when the longitudinal edge of the blade is in contact with the circumference thereof, and a second scale at right-angles to the first scale and adjustable along the blade.

3. A shaft lining and leveling device comprising a blade, a frame, and means for guiding said frame to move at right-angles to the blade, said frame comprising two arms located at equal angles with the direction of motion of the frame a portion of the edge of said blade being located between the arms in all positions of the frame.

4. A shaft liner and leveler comprising a blade having a longitudinal slot, a guide perpendicular to said slot, a frame having two straight-edges located at equal angles from the guide and movable along said guide, said frame having two slots each located parallel to one of said straight-edges, and a pair of rollers each roller passing through the slot in the blade and one of the slots in the frame, said rollers being adapted to assist in holding the frame and blade together.

5. A shaft liner and leveler comprising a blade, a guide perpendicular thereto, a frame having two straight edges located at equal angles from the guide and movable along the guide, said frame having two slots each parallel with one of said straight edges, and means mounted on the blade for engaging said slots to hold the frame and blade together.

6. A shaft liner and leveler, comprising a blade, a guide perpendicular to said blade, a frame having two bars located at equal angles from the guide, said straight edge being movable along the guide, said frame having two slots, one in each of said bars, said blade having a slot, and means passing through said slots in the frame and said slot in the blade for holding the frame and blade together.

7. A shaft liner and leveler, comprising a circle centering frame, a straight edge having a scale adjustably mounted thereon, said scale and straight edge being adapted to rest directly on the surface of an article having a circular cross section while the same is being centered and in a plane at right angles to the axis of the article, whereby the distance of the center from a plane including any point on the scale and perpendicular to the straight edge may be ascertained, and means for guiding said frame to move in a straight line.

8. A liner and leveler device comprising a circle centering frame, a horizontal straight edge having a scale freely and vertically adjustable on the centering frame and adapted to rest directly on the top surface of an article having a circular cross-section while being centered and in a plane at right angles to the axis of the article, whereby the horizontal distance of a vertical plane including the center or axis from any point on the scale may be ascertained, and means for guiding the frame to move vertically with respect to said horizontal straight edge.

In testimony whereof I have hereunto set my hand, in the presence of two subscribing witnesses.

ERNEST E. CLARK.

Witnesses:
ALBERT E. FAY,
MARY E. REGAN.